US008241179B2

(12) United States Patent
Shin

(10) Patent No.: US 8,241,179 B2
(45) Date of Patent: Aug. 14, 2012

(54) HYDRAULIC CONTROL APPARATUS OF CONTINUOUSLY VARIABLE TRANSMISSION OF HYBRID VEHICLE

(75) Inventor: Yonguk Shin, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 547 days.

(21) Appl. No.: 12/605,191

(22) Filed: Oct. 23, 2009

(65) Prior Publication Data

US 2010/0125018 A1 May 20, 2010

(30) Foreign Application Priority Data

Nov. 17, 2008 (KR) ........................ 10-2008-0113847

(51) Int. Cl.
*B60W 10/04* (2006.01)
*B60W 10/10* (2006.01)
*A01G 25/16* (2006.01)
*F16H 15/38* (2006.01)
*F16H 61/664* (2006.01)

(52) U.S. Cl. ........ 477/50; 477/37; 137/625; 137/625.69

(58) Field of Classification Search ............. 477/34, 477/37, 45, 50, 158; 137/625, 625.69
See application file for complete search history.

(56) References Cited

U.S. PATENT DOCUMENTS

| 2007/0131290 | A1* | 6/2007 | Kim | ................. 137/625.69 |
| 2008/0045378 | A1* | 2/2008 | Kim | ....................... 477/46 |
| 2011/0203682 | A1* | 8/2011 | Ishikawa et al. | .......... 137/487.5 |

FOREIGN PATENT DOCUMENTS

| JP | 2001-206108 A | 7/2001 |
| JP | 2004-239351 A | 8/2004 |
| KR | 10-2008-0016225 A | 2/2008 |
| KR | 10-2008-0044057 A | 5/2008 |

\* cited by examiner

*Primary Examiner* — Tisha Lewis
(74) *Attorney, Agent, or Firm* — Morgan, Lewis & Bockius LLP

(57) ABSTRACT

A hydraulic control apparatus of a continuously variable transmission of a hybrid vehicle may include a D-N control valve that converts a state, in which a hydraulic pressure is supplied from a line regulator valve to a solenoid feed valve through a second regulator valve according to changes of a driving pulley control pressure and a clutch lubrication control pressure with respect to driven pulley control pressure, and a state, in which the hydraulic pressure from the line regulator valve is directly supplied to the solenoid feed valve, into each other.

3 Claims, 4 Drawing Sheets

HYDRAULIC CONTROL APPARATUS OF CONTINUOUSLY VARIABLE TRANSMISSION OF HYBRID VEHICLE

CROSS-REFERENCE TO RELATED APPLICATIONS

The present application claims priority to Korean Patent Application Number 10-2008-0113847, filed on Nov. 17, 2008, the entire contents of which is incorporated herein for all purposes by this reference.

BACKGROUND OF THE INVENTION

1. Field of the Invention

The present invention relates to a hydraulic control apparatus of a continuously variable transmission that is equipped in a hybrid vehicle, particularly a technology of efficiently generating hydraulic pressure required for a hydraulic control apparatus according to the traveling state of a vehicle.

2. Description of Related Art

FIG. 1 shows an example of a hydraulic control apparatus of a continuously variable transmission of a hybrid vehicle, in which hydraulic pressure supplied from an oil pump 500 is supplied toward a driving pulley 504 and a driven pulley 506 after being adjusted at predetermined pressure by a line regulator valve 502, the hydraulic pressure supplied toward driving pulley 504 is adjusted by a transmission gear ratio control valve 508 and then supplied to driving pulley 504, and the hydraulic pressure supplied toward driven pulley 506 is adjusted by a secondary valve 510 and then supplied to driven pulley 506.

The hydraulic pressure adjusted by line regulator valve 502 is also supplied to a second regulator valve 512, such that second regulator valve 512 adjusts hydraulic pressure that is supplied to a starting clutch control solenoid valve 514, a limp home valve 516, and a solenoid feed valve 518.

Starting clutch control solenoid valve 514 controls and supplies operational pressure for a reverse brake 520 and a forward clutch 522, solenoid feed valve 518 supplies the adjusted hydraulic pressure to a transmission gear ratio control solenoid valve 524, a secondary control solenoid valve 526, a line regulator solenoid valve 528, and a clutch lubrication control solenoid valve 530 to control transmission gear ratio control valve 508, a secondary valve 510, line regulator valve 502, and a lubrication control valve 532, respectively.

The other parts have configurations and functions that are not substantially different from those of hydraulic control apparatuses of continuously variable transmission.

The pressure supplied toward driving pulley 504 and driven pulley 506 from line regulator valve 502 is referred to as 'pulley pressure' and the pressure supplied to transmission gear ratio control solenoid valve 524, secondary control solenoid valve 526, line regulator solenoid valve 528, and clutch lubrication control solenoid valve 530 from solenoid feed valve 518 is referred to as 'solenoid valve supply pressure' herein.

When a vehicle stops in a D-range, other pressure does not substantially need to be supplied than the pulley pressure and the solenoid valve supply pressure required for quick operation when restarting the vehicle; however, existing structures of hydraulic control apparatuses cannot help supplying hydraulic pressure to unnecessary parts, such as the hydraulic pressure supplied toward forward clutch 522, which is inefficient.

That is, since hydraulic pressure is supplied to unnecessary parts when a vehicle stops in the D-range, energy is unnecessarily consumed and the efficiency of the continuously variable transmission is decreased.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a hydraulic control apparatus of a continuously variable transmission of a hybrid vehicle that stops hydraulic pressure supplied to unnecessary parts and automatically ensures a state of supplying only pulley pressure and solenoid valve supply pressure required for quickly restarting a vehicle when the vehicle stops in a D-range, and appropriately supplies hydraulic pressure again to all the parts when restarting the vehicle, thereby improving the efficiency of the continuously variable transmission.

In an aspect of the present invention, a hydraulic control apparatus of a continuously variable transmission of a hybrid vehicle may include a D-N control valve that converts a state, in which a hydraulic pressure is supplied from a line regulator valve to a solenoid feed valve through a second regulator valve according to changes of a driving pulley control pressure and a clutch lubrication control pressure with respect to driven pulley control pressure, and a state, in which the hydraulic pressure from the line regulator valve is directly supplied to the solenoid feed valve, into each other.

The driven pulley control pressure may be exerted in a side of a valve spool of the D-N control valve, and the driving pulley control pressure and the clutch lubrication control pressure may be exerted in the opposite side thereof, such that, in a D-range stop, the valve spool is moved in one direction by the driven pulley control pressure, while in a D-range traveling, the valve spool is moved in the other direction by the driving pulley control pressure and the clutch lubrication control pressure, and a plurality of ports are formed such that, the hydraulic pressure from the line regulator valve is directly supplied to the solenoid feed valve after the valve spool is moved in the one direction and the hydraulic pressure from the line regulator valve is supplied to the solenoid feed valve through the second regulator valve after the valve spool is moved in the other direction.

The D-N control valve may include a valve body having a first port where the driven pulley control pressure adjusted by a second control solenoid valve is supplied, a second port where a hydraulic pressure is supplied from the line regulator valve, a third port connected to the second regulator valve to supply a hydraulic pressure, a fourth port connected to the second regulator valve to receive a hydraulic pressure, a fifth port connected to the solenoid feed valve to supply a hydraulic pressure, a sixth port connected to the line regulator valve to receive a hydraulic pressure, a seventh port where the driving pulley control pressure adjusted by a transmission gear ratio control solenoid valve is supplied, and an eighth port where the clutch lubrication control pressure adjusted by a clutch lubrication control solenoid valve is supplied, which are sequentially formed, and the valve spool integrally having a first land changing communication between the second port and the third port, and a second land and a third land changing communication between the fourth port and the fifth port and between the fifth port and the sixth port, according to changes in the control pressures supplied to the valve body.

In various aspects, the present invention stops hydraulic pressure supplied to unnecessary parts and automatically ensures a state of supplying only pulley pressure and solenoid valve supply pressure required for quickly restarting a vehicle when the vehicle stops in a D-range, and appropriately supplies hydraulic pressure again to all the parts when restarting the vehicle, thereby improving the efficiency of a continuously variable transmission.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
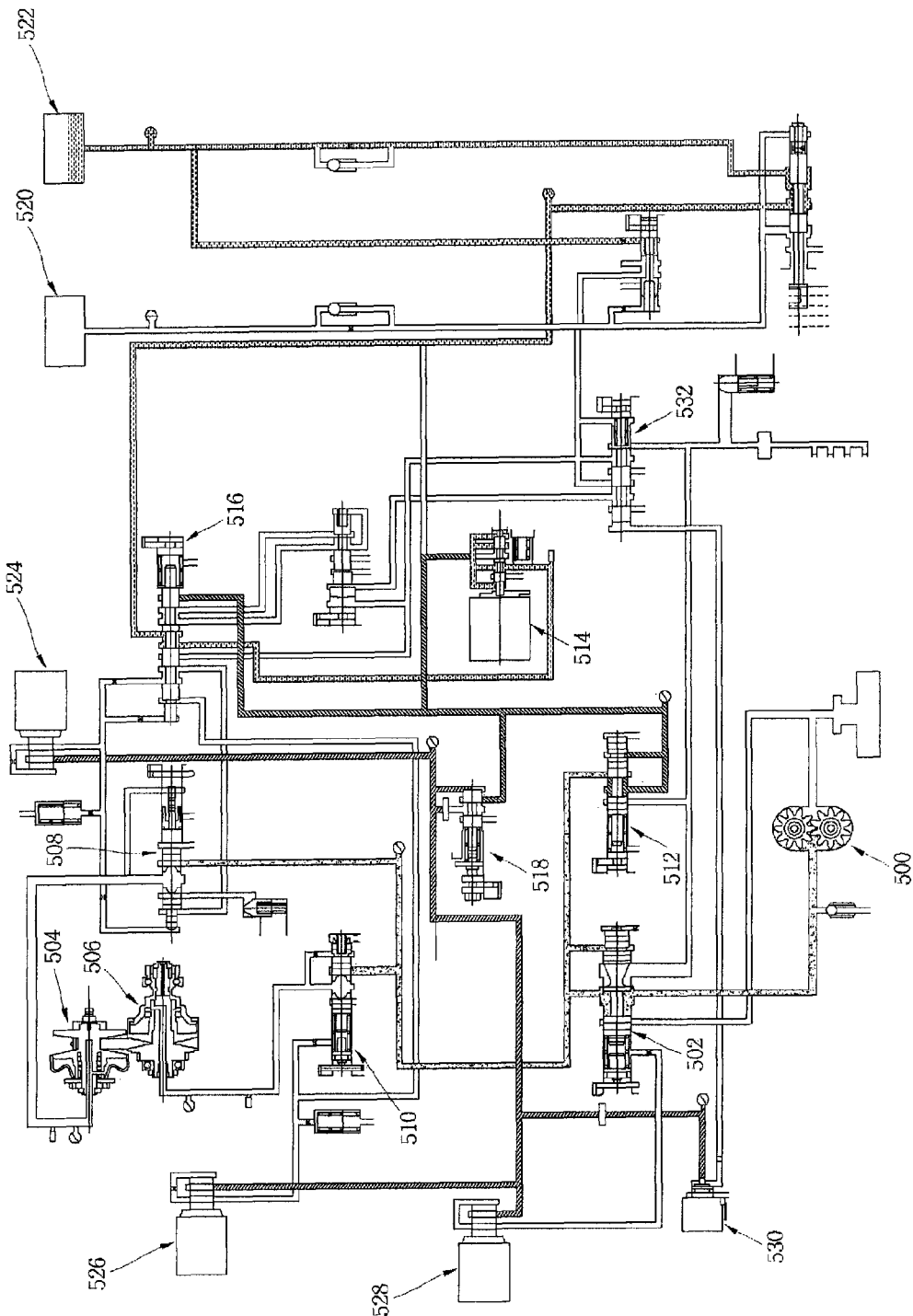
FIG. 1 is a view showing a hydraulic control apparatus of a continuously variable transmission of a hybrid vehicle according to the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 2:
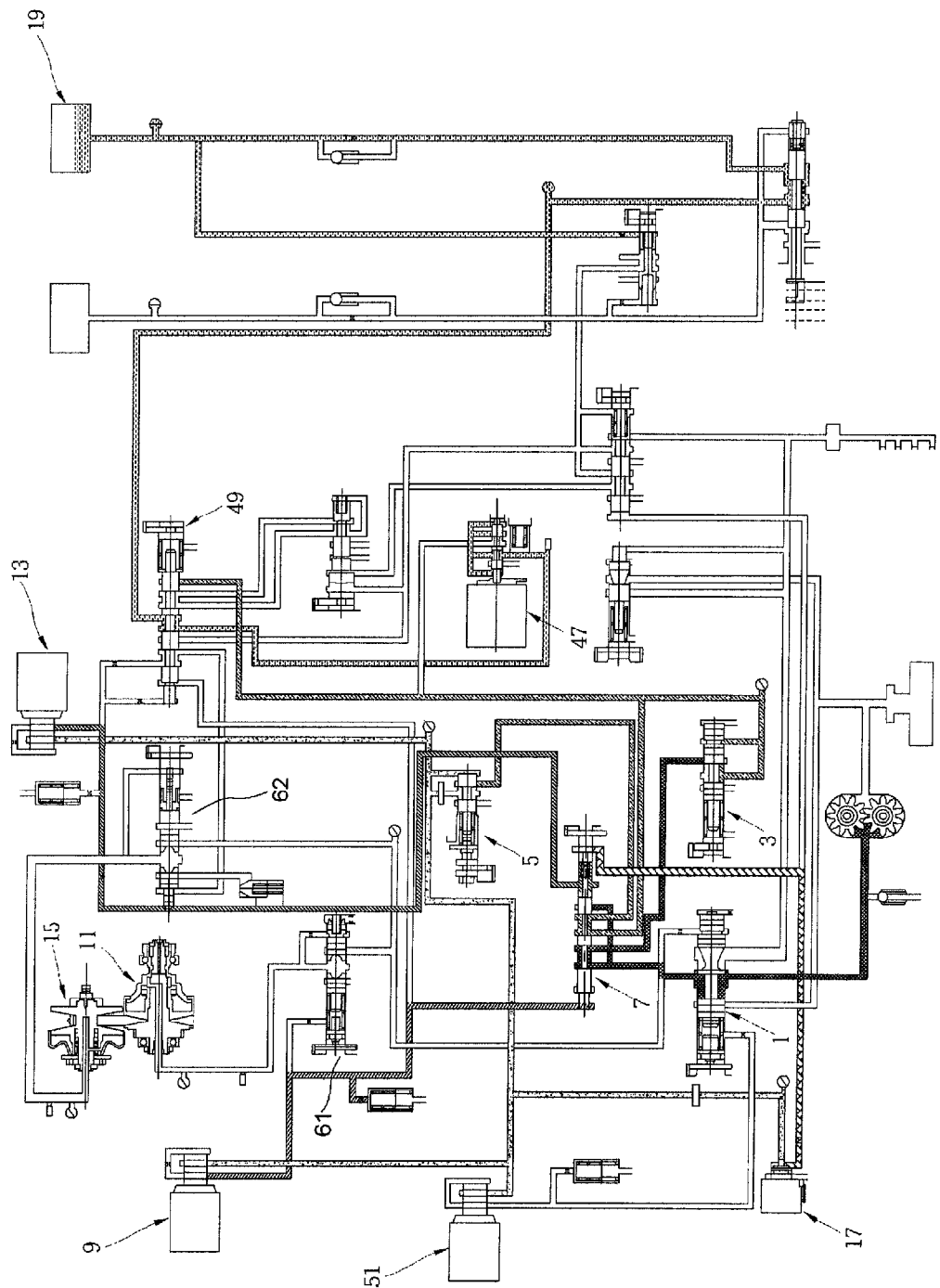
FIG. 2 is a view showing a hydraulic control apparatus of a continuously variable transmission of a hybrid vehicle according an exemplary embodiment of the present invention to illustrate the operation in D-range normal traveling.
Figure 3:
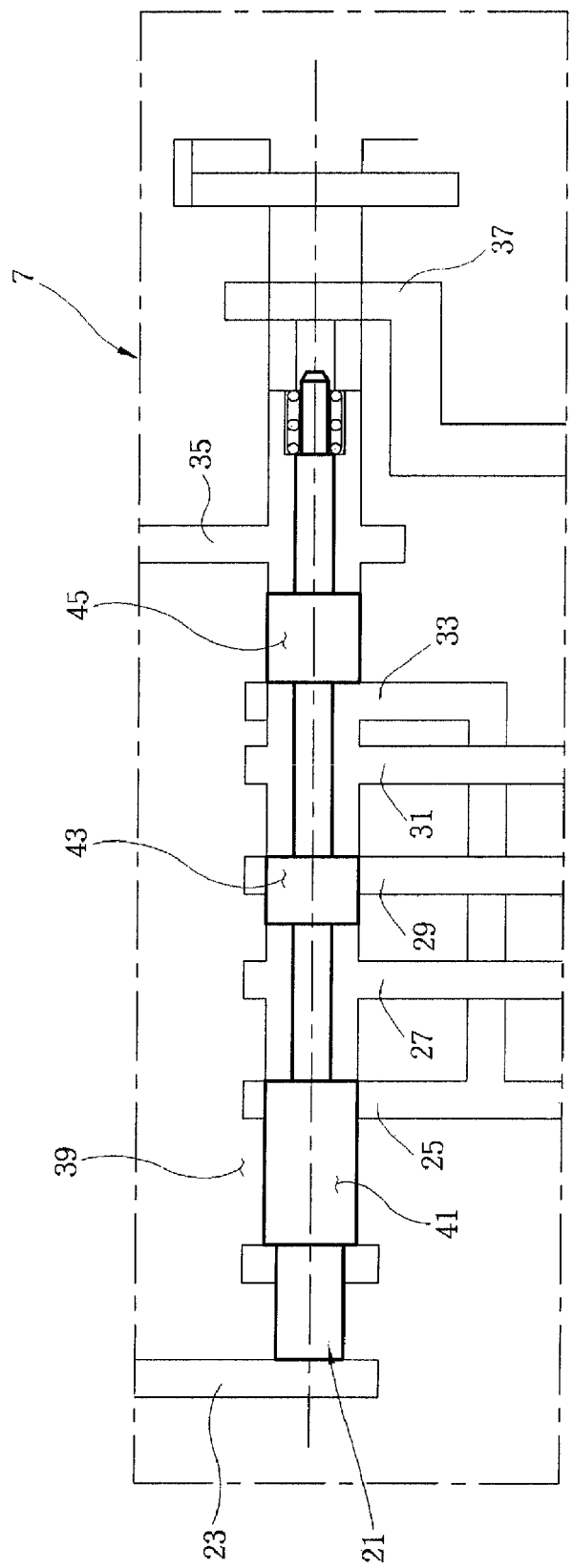
FIG. 3 is a view showing in detail the structure of the D-N control valve of FIG. 2.
Figure 4:
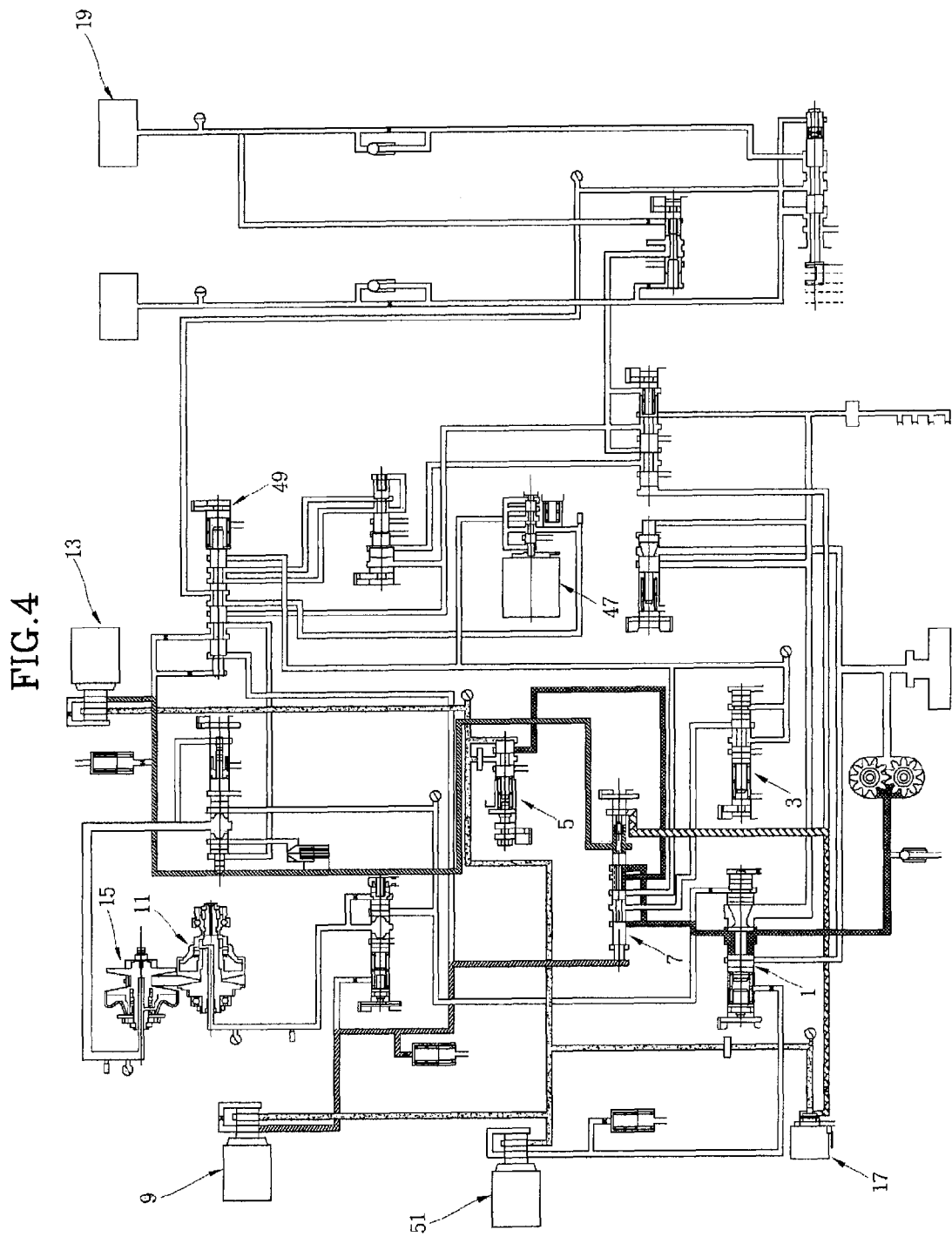
FIG. 4 is a view illustrating the operation in D-range stop, comparing with FIG. 2.

Referring to FIGS. 2 to 4, a hydraulic control apparatus of a continuously variable transmission of a hybrid vehicle includes a D-N control valve 7 that converts a state in which hydraulic pressure is supplied from a line regulator valve 1 to a solenoid feed valve 5 through a second regulator valve 3 according to changes of driving pulley control pressure and clutch lubrication control pressure with respect to driven pulley control pressure and a state in which the hydraulic pressure from line regulator valve 1 is directly supplied to solenoid feed valve 5, into each other.

The driven pulley control pressure is pressure that a secondary control solenoid valve 9 that has received the solenoid valve supply pressure from solenoid feed valve 5 adjusts and outputs to control a driven pulley 11 through a secondary valve 61, and the driving pulley control pressure is pressure that a transmission gear ratio control solenoid valve 13 that has received the solenoid valve supply pressure from solenoid feed valve 5 adjusts and outputs to control a driving pulley 15 through a transmission ratio control valve 62.

Further, the clutch lubrication control pressure is pressure that clutch lubrication control solenoid valve 17 outputs after adjusting solenoid valve supply pressure received from solenoid feed valve 5.

When a hybrid vehicle equipped with a continuously variable transmission that has traveled in the D-range is stopped, minimum transmission gear ratio is implemented by minimizing the pressure of driving pulley 15 and maximizing the pressure of driven pulley 11. Accordingly, the driving pulley control pressure for controlling the pressure of driving pulley 15 is at the minimum and the driven pulley control pressure for controlling pressure of driven pulley 11 is at the maximum.

Further, when the vehicle stops, the flow rate required for lubricating and cooling forward clutch 19 is minimized, and a large amount of slip is generated when the vehicle starts, such that the flow rate required for lubrication is maximized.

Driven pulley control pressure is exerted in a side of a valve spool 21 of D-N control valve 7, and the driving pulley control pressure and the clutch lubrication control pressure are exerted in the opposite side, such that, in D-range stop, valve spool 21 is moved in one direction by the driven pulley control pressure, while in D-range traveling, valve spool 21 is moved in the other direction by the driving pulley control pressure and the clutch lubrication control pressure.

Ports are formed such that, the hydraulic pressure from line regulator valve 1 is directly supplied to solenoid feed valve 5 after valve spool 21 is moved in one direction and the hydraulic pressure from line regulator valve 1 is supplied to solenoid feed valve 5 through second regulator valve 3 after valve spool 21 is moved in the other direction.

That is, while a vehicle travels in the D-range, the hydraulic pressure from line regulator valve 1 is supplied to solenoid feed valve 5 through second regulator valve 3, thereby forming substantially the same hydraulic pipe line as the related art. However, when the vehicle stops in the D-range, the hydraulic pressure from line regulator valve 1 is directly supplied to solenoid feed valve 5 and line pressure from line regulator valve 1 is not supplied to second regulator valve 3, such that hydraulic pressure supplied to forward clutch 19 through second regulator valve 3 is stopped.

D-N control valve 7 includes a valve body 39 having a first port 23 where the driven pulley control pressure adjusted by second control solenoid valve 9 is supplied, a second port 25 where hydraulic pressure is supplied from line regulator valve 1, a third port 27 connected to second regulator valve 3 to supply hydraulic pressure, a fourth port 29 connected to second regulator valve 3 to receive hydraulic pressure, a fifth port 31 connected to solenoid feed valve 5 to supply hydraulic pressure, a sixth port 33 connected to line regulator valve 1 to receive hydraulic pressure, a seventh port 35 where the driving pulley control pressure adjusted by transmission gear ratio control solenoid valve 13 is supplied, and an eighth port 37 where clutch lubrication control pressure adjusted by clutch lubrication control solenoid valve 17 is supplied, which are sequentially formed; and valve spool 21 integrally having a first land 41 changing communication between second port 25 and third port 27, and a second land 43 and a third land 45 changing communication between fourth port 29 and fifth port 31 and between fifth port 31 and sixth port 33, according to changes in hydraulic pressure supplied to valve body 39, According to a hydraulic control apparatus of a continuously variable transmission of a hybrid vehicle of the present invention having the above configuration, while a vehicle normally travels in the D-range, as shown in FIG. 2, since the pressure exerted in valve spool 21 by the driving pulley control pressure and the clutch lubrication control pressure is larger than the driven pulley control pressure, valve spool 21 of D-N control valve 7 moves in the other direction (to the left in the figure), the line pressure from line regulator valve 1 is supplied to second regulator valve 3 through second port 25 and third port 27 of D-N control valve 7. Further, second regulator valve 3, as in the related art, supplies control pressure to a starting clutch control solenoid valve 47 and a limp home valve 49 as well as solenoid feed valve 5, such that forward clutch 19 is operated by pressure controlled by starting clutch control solenoid valve 47.

When the vehicle that has traveled as described above stops, the driving pulley control pressure and the clutch lubrication control pressure are minimized due to the above reason and the driven pulley control pressure is maximized, such that valve spool 21 of D-N control valve 7 moves opposite to the above case, that is, to the right in the figure and reaches the position shown in FIG. 4.

Therefore, the line pressure supplied from line regulator valve 1 is not supplied to D-N control valve 7 through second port 25, but supplied to sixth port 33 and directly supplied to solenoid feed valve 5 through fifth port 31, such that solenoid feed valve 5 can continuously supply solenoid supply pressure, thereby ensuring normal operations of transmission gear ratio control solenoid valve 13, secondary control solenoid valve 9, line regulator solenoid valve 51, and clutch lubrication control solenoid valve 17.

Further, since the hydraulic pressure cannot be supplied from line regulator valve 1 to second port 25, second regulator valve 3 that has received line pressure through third port 27 cannot receive the line pressure, and as a result, it is possible to stop unnecessary flow rate supplied toward forward clutch 19.

That is, in D-range stop, D-N control valve 7 is automatically operated, such that the hydraulic pressure supplied toward forward clutch 19 is stopped, thereby preventing unnecessary consumption of energy and improving the efficiency of the continuously variable transmission.

Further, when the vehicle restarts, the driven pulley control pressure, driving pulley control pressure, and clutch lubrication control pressure exerted in valve spool 21 of D-N control valve 7 change, such that valve spool 21 moves again to the left as shown in FIG. 2. Therefore, appropriate hydraulic pressure can be supplied toward forward clutch 19 while allowing the normal traveling of the vehicle.

For convenience in explanation and accurate definition in the appended claims, the terms "left" or "right" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hydraulic control apparatus of a continuously variable transmission of a hybrid vehicle comprising:
    a D-N control valve that converts a state, in which a hydraulic pressure is supplied from a line regulator valve to a solenoid feed valve through a second regulator valve according to changes of a driving pulley control pressure and a clutch lubrication control pressure with respect to driven pulley control pressure, and a state, in which the hydraulic pressure from the line regulator valve is directly supplied to the solenoid feed valve, into each other.

2. The hydraulic control apparatus of a continuously variable transmission of a hybrid vehicle as defined in claim 1, wherein the driven pulley control pressure is exerted in a side of a valve spool of the D-N control valve, and the driving pulley control pressure and the clutch lubrication control pressure are exerted in the opposite side thereof, such that, in a D-range stop, the valve spool is moved in one direction by the driven pulley control pressure, while in a D-range traveling, the valve spool is moved in the other direction by the driving pulley control pressure and the clutch lubrication control pressure, and
    a plurality of ports are formed such that, the hydraulic pressure from the line regulator valve is directly supplied to the solenoid feed valve after the valve spool is moved in the one direction and the hydraulic pressure from the line regulator valve is supplied to the solenoid feed valve through the second regulator valve after the valve spool is moved in the other direction.

3. The hydraulic control apparatus of a continuously variable transmission of a hybrid vehicle as defined in claim 2, wherein the D-N control valve includes:
    a valve body having a first port where the driven pulley control pressure adjusted by a second control solenoid valve is supplied, a second port where a hydraulic pressure is supplied from the line regulator valve, a third port connected to the second regulator valve to supply a hydraulic pressure, a fourth port connected to the second regulator valve to receive a hydraulic pressure, a fifth port connected to the solenoid feed valve to supply a hydraulic pressure, a sixth port connected to the line regulator valve to receive a hydraulic pressure, a seventh port where the driving pulley control pressure adjusted by a transmission gear ratio control solenoid valve is supplied; and an eighth port where the clutch lubrication control pressure adjusted by a clutch lubrication control solenoid valve is supplied, which are sequentially formed; and
    the valve spool integrally having a first land changing communication between the second port and the third port, and a second land and a third land changing communication between the fourth port and the fifth port and between the fifth port and the sixth port, according to changes in the control pressures supplied to the valve body.

* * * * *